(12) United States Patent
Tsai

(10) Patent No.: US 8,651,245 B1
(45) Date of Patent: Feb. 18, 2014

(54) BICYCLE BRAKE UNIT

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 44 days.

(21) Appl. No.: 13/571,339

(22) Filed: Aug. 9, 2012

(51) Int. Cl.
*B62L 3/00* (2006.01)

(52) U.S. Cl.
USPC ........................................ 188/24.22; 188/2 D

(58) Field of Classification Search
USPC ........ 188/24.11, 24.12, 24.21, 24.22, 2 D, 28
See application file for complete search history.

(56) References Cited

U.S. PATENT DOCUMENTS

| 7,677,365 | B2 * | 3/2010 | Nago | 188/24.19 |
|---|---|---|---|---|
| 7,802,660 | B2 * | 9/2010 | Tsai | 188/24.13 |
| 8,061,487 | B2 * | 11/2011 | Tsai | 188/24.12 |
| 8,151,945 | B2 * | 4/2012 | Tsai | 188/24.19 |
| 8,522,929 | B2 * | 9/2013 | Nago | 188/24.22 |
| 2005/0061587 | A1 * | 3/2005 | Tsai | 188/24.14 |

* cited by examiner

*Primary Examiner* — Thomas Irvin

(57) ABSTRACT

A bicycle brake unit includes a first arm, a second arm and a connector, when the brake cable is pulled, the first and second cable connectors on the two arms are moved toward each other to pivot the first and second arms. The first rail on the first arm and the second rail on the second arm are moved relative to each other via the rotation of the pivot. The pivot is movable in the elongate slot in the connector which is pivotably connected to the first and second arms. The first and second arms are pivoted toward each other to brake the wheel by the brake pads on the two arms. The first and second arms apply even forces to the two brake pads.

7 Claims, 5 Drawing Sheets

BICYCLE BRAKE UNIT

BACKGROUND OF THE INVENTION

1. Field of the Invention

The present invention relates to a brake unit, and more particularly, to a bicycle brake unit.

2. Description of Related Art

A conventional bicycle brake unit is disclosed and comprises two arms and two connection units which are connected to the two arms respectively. Each connection unit has a sleeve, a cap connected to the front end of the sleeve, a resilient member whose two ends are respectively in contact with the arm and the cap, and a bolt. The rear end of the sleeve and the cap respectively has a nut embedded therein. The brake unit can be installed in two different directions. The cap includes a first driving portion and a second driving portion which is different from the first driving portion in width.

Another conventional bicycle brake unit discloses a carbon fiber brake unit which has a curved rod and a triangular rod. The curved rod has a positioning portion to which a first lining plate is connected. The curved rod has a fixing portion to which a clamping unit is connected for clamping the cable. The curved rod has a slot and two arms extend through the slot and each arm has a resilient plate connected thereto. The triangular rod has a second lining plate connected to the first end thereof and a connector is connected to the second end of the triangular rod. The third end of the triangular rod is pivotably connected to the curved rod and extends through the two respective holes of the arms. A curved wall is connected between the first and third ends, and the curved wall is in contact with the inside of the resilient plate.

The action ends for the curved rod and the triangular rod are at the same end and the central portion is pivotable so that the two brake pads may not be evenly applied by the braking forces. Therefore, the efficiency for braking is affected.

The present invention intends to provide a bicycle brake unit to improve the shortcomings of the conventional brake units.

SUMMARY OF THE INVENTION

It is therefore one object of the invention to provide a bicycle brake unit comprising a first arm having a first transverse portion and a first upright portion which is connected between a first end and a second end of the first transverse portion. The first transverse portion has a first cable connector on the first end thereof and a first rail is connected to a lower side of the second end of the first transverse portion. The first upright portion has a first pivot hole defined therethrough. The axis of the first pivot hole is perpendicular to the axis of the first transverse portion. A second arm has a second transverse portion and a second upright portion, wherein the second transverse portion has a second cable connector on the first end thereof and a second end of the second transverse portion connected to the second upright portion. The first and second cable connectors are movable relative to each other by a cable. A flat face extends from the second arm and toward the first arm. The flat face has a second rail which is located corresponding to the first rail. A second pivot hole is defined through the second end of the second arm. A connector is connected to the first arm, and the first arm is located between the second arm and the connector. The connector has a first inclined portion and a second inclined portion, the first and second inclined portions are connected as a V-shaped part. The first inclined portion has a third pivot hole which is located corresponding to the first pivot hole of the first arm. A first pivotal member extends through the first and third pivot holes. The second inclined portion has a fourth pivot hole which is located corresponding to the second pivot hole of the second arm. A second pivotal member extends through the second and fourth pivot holes. An elongate slot is defined in the conjunction between the first and second inclined portions. A pivot is rotatably connected between the first and second rails and is movable in the elongate slot.

Preferably, the first upright portion has a first slot defined through the distal end thereof, and the axis of the first slot is perpendicular to the axis of the first pivot hole. The second upright portion has a second slot defined through the distal end thereof, and the axis of the second slot is the same as the axis of the first slot.

Preferably, each of the first and second slots is connected with a brake pad.

Preferably, the first and second rails are moved in opposite directions so as to drive the pivot to rotate.

Preferably, a curved slot is defined between the first and second ends of the second transverse portion.

Preferably, the pivot has a first flange, a shank, a second flange and a third flange. The first and second flanges are connected to two ends of the shank. The third flange is connected to outside of the second flange. The outer diameter of the second flange is smaller than that of the third flange. The shank is rotatably connected between the first and second rails. The first flange is rotatably clamped between the first and second rails. The second and third flanges are located in the elongate slot.

Preferably, the cable is a steel cable.

The above and other objects, features and advantages of the invention will become apparent from the following detailed description taken with the accompanying drawings.

DETAILED DESCRIPTION OF THE INVENTION

Figure 1:
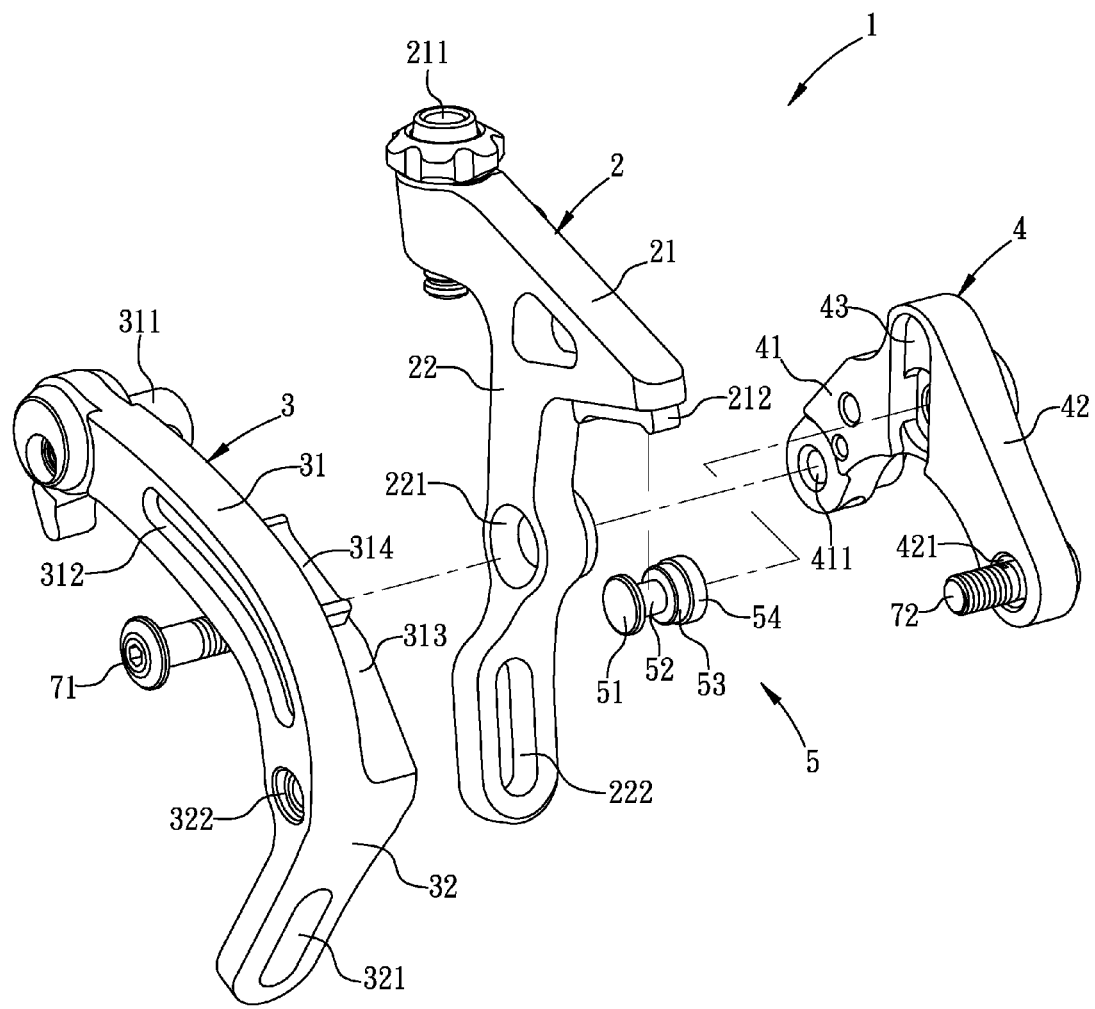
FIG. 1 is an exploded view to show the bicycle brake unit of the present invention.

Referring to FIGS. 1 to 5, the bicycle brake unit 1 of the present invention comprises a first arm 2 which has a first transverse portion 21 and a first upright portion 22 which is connected between the first end and the second end of the first transverse portion 21. The first transverse portion 21 has a first cable connector 211 on the first end thereof and a first rail 212 is connected to the lower side of the second end of the first transverse portion 21. The first upright portion 22 has a first pivot hole 221 defined therethrough. The axis of the first pivot hole 221 is perpendicular to the axis of the first transverse portion 21. The first upright portion 22 has a first slot 222 defined through the distal end thereof. The axis of the first slot 222 is perpendicular to the axis of the first pivot hole 221. A brake pad is connected to the first slot 222.

Figure 2:
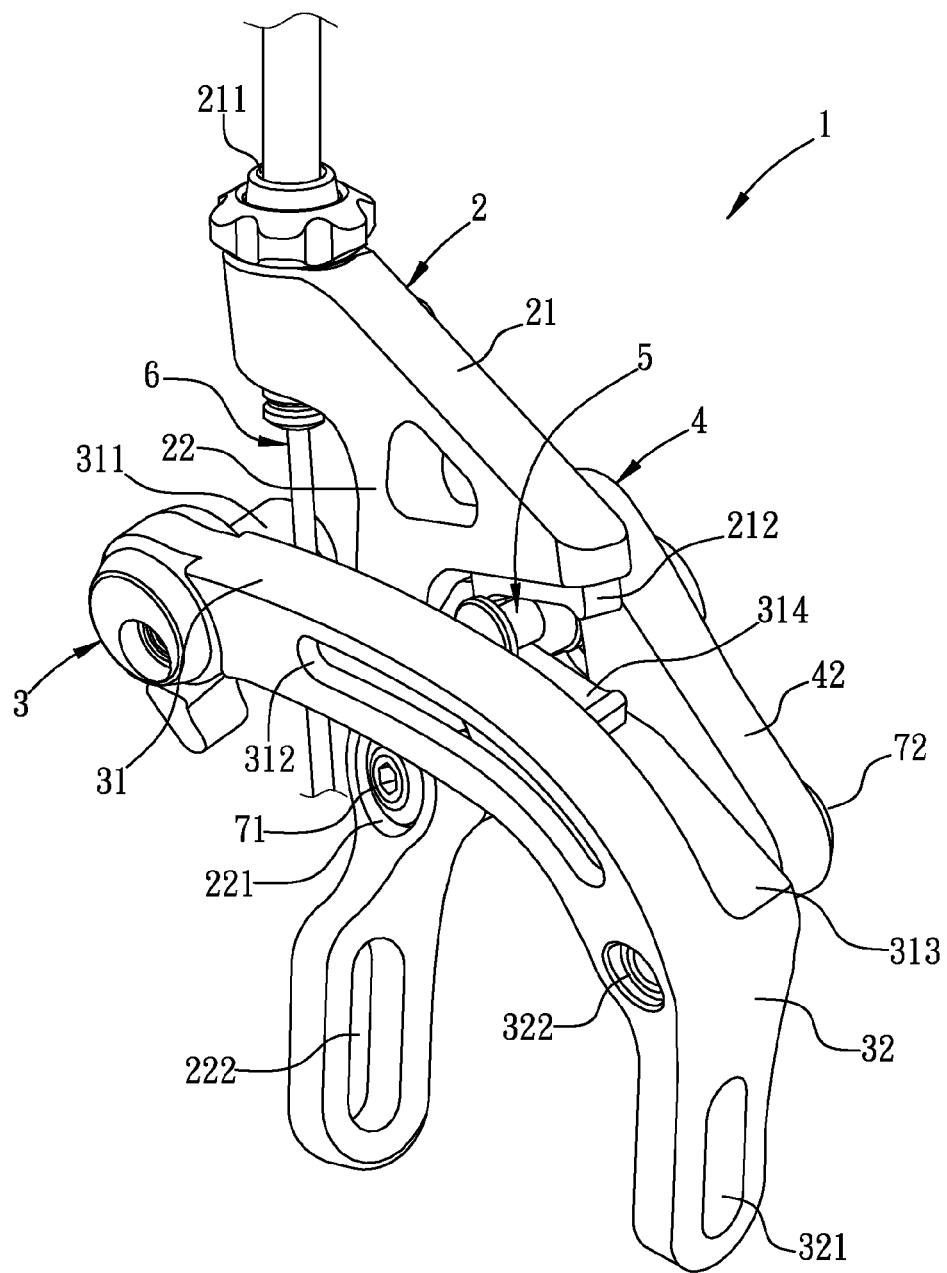
FIG. 2 is a perspective view to show the bicycle brake unit of the present invention.
Figure 3:
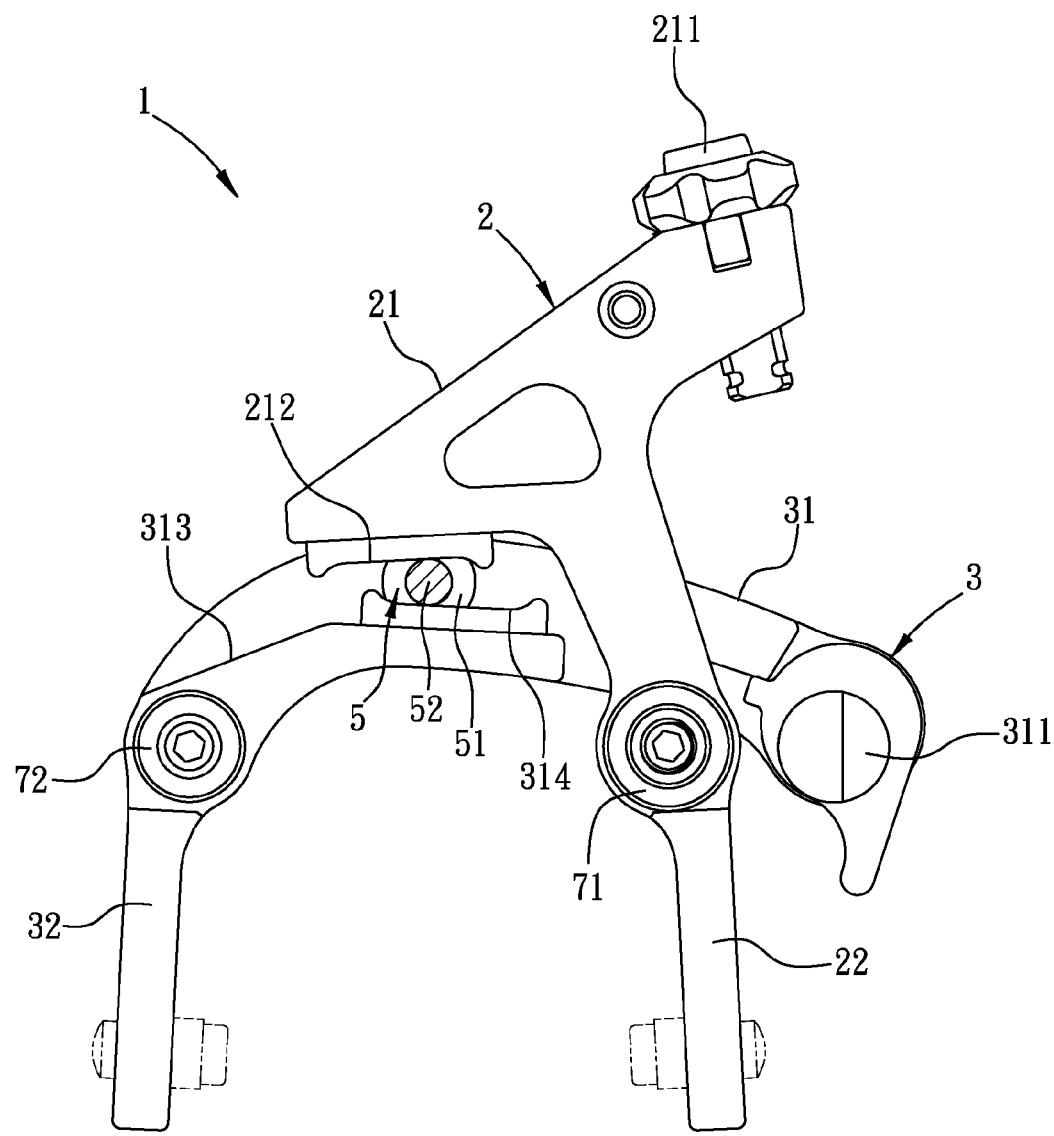
FIG. 3 is a side view of the bicycle brake unit of the present invention.
Figure 4:
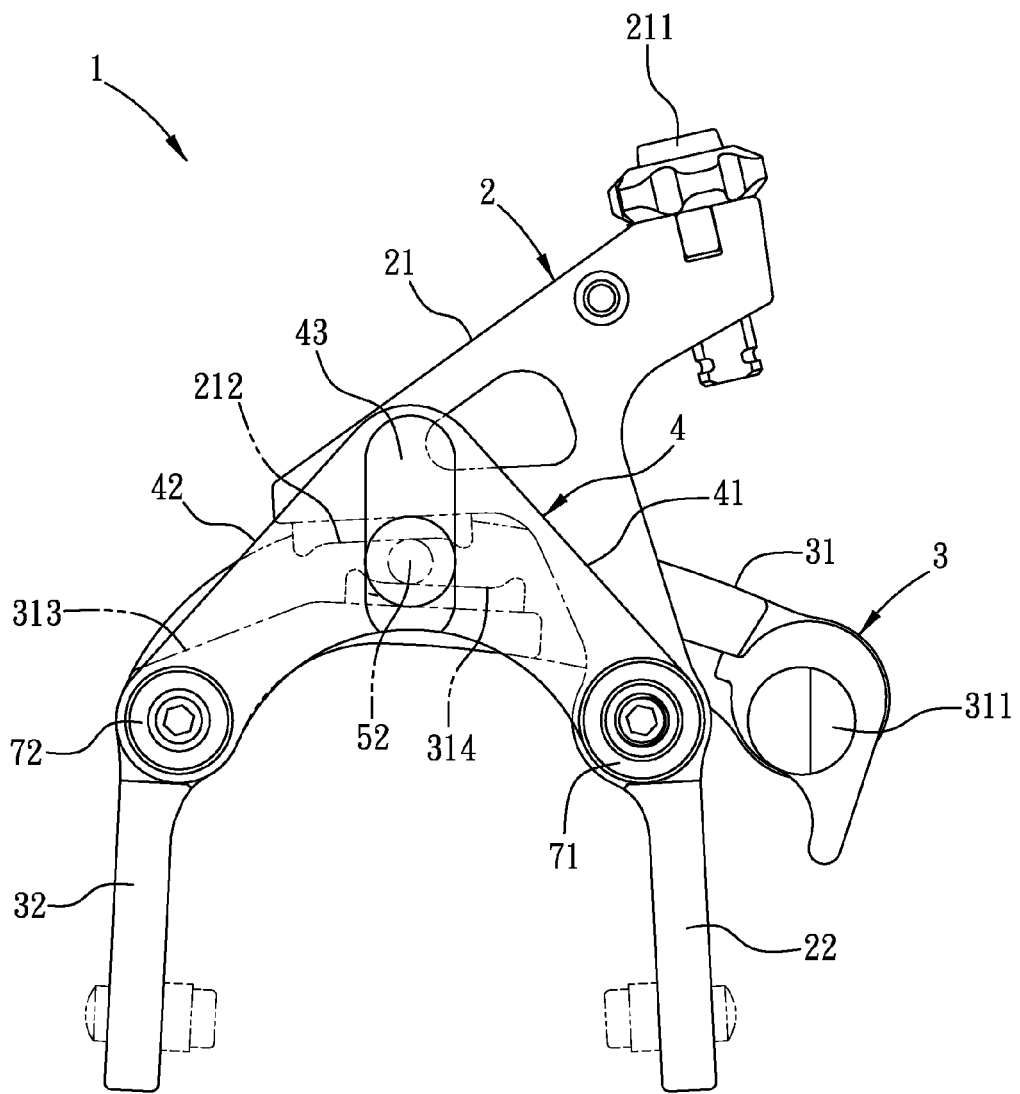
FIG. 4 is a side view of the bicycle brake unit of the present invention, and shows that the pivot is located between the first and second rails.
Figure 5:
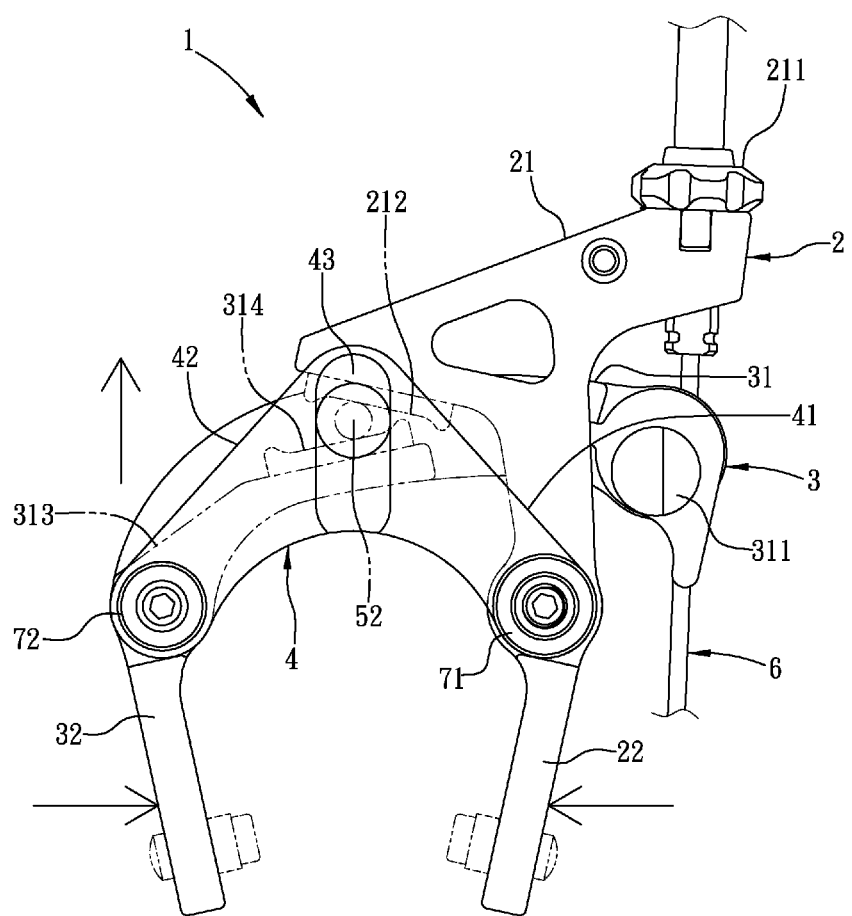
FIG. 5 shows the action of the bicycle brake unit of the present invention.

A second arm 3 is located beside the first arm and has a second transverse portion 31 and a second upright portion 32. The second transverse portion has a second cable connector 311 on the first end thereof and the second end of the second transverse portion 31 is connected to the second upright portion. The first and second cable connectors 211, 311 are movable relative to each other by a cable 6 as shown in FIG. 2. The cable 6 can be a steel cable. A curved slot 312 is defined between the first and second ends of the second transverse portion 31. A flat face 313 extends from the second arm 3 and toward the first arm 2. The flat face 313 has a second rail 314 which is located corresponding to the first rail 212. The second upright portion 32 has a second slot 321 defined through the distal end thereof, and the axis of the second slot 321 is the same as the axis of the first slot 222. A second pivot hole 322 is defined through the second end of the second arm 3. A brake pad is connected to the second slot 321.

A connector 4 is connected to the first arm 2 which is located between the second arm and the connector 3, 4. The connector 4 has a first inclined portion 41 and a second inclined portion 42. The first and second inclined portions 41, 42 are connected at the two respective ends and as a V-shaped part. The first inclined portion 41 has a third pivot hole 411 which is located corresponding to the first pivot hole 221 of the first arm 2. A first pivotal member 71 extends through the first and third pivot holes 221, 411. The second inclined portion 42 has a fourth pivot hole 421 which is located corresponding to the second pivot hole 322 of the second arm 3. A second pivotal member 72 extends through the second and fourth pivot holes 322, 421. An elongate slot 43 defined in the conjunction between the first and second inclined portions 41, 42.

The pivot 5 is rotatably connected between the first and second rails 212, 314 and movable in the elongate slot 43. The pivot 5 has a first flange 51, a shank 2, a second flange 53 and a third flange 54. The first and second flanges 51, 53 are connected to two ends of the shank 52. The third flange 54 is connected to outside of the second flange 53. The outer diameter of the second flange 53 is smaller than that of the third flange 54. The shank 52 is rotatably connected between the first and second rails 212, 314. The first flange 51 is rotatably clamped between the first and second rails 212, 314. The second and third flanges 53, 54 are located in the elongate slot 43.

When the cable 6 is pulled, the first and second cable connectors 211, 311 on the two arms 2, 3 are moved toward each other so as to pivot the first and second arms 2, 3 relative to each other. The first rail 212 on the first arm 2 and the second rail 314 on the second arm 3 are moved relative to each other via the rotation of the pivot 5. In detail, the first and second rails 212, 314 are moved in opposite direction so as to drive the pivot 5 to rotate. The pivot 5 is movable in the elongate slot 43 in the connector 4 up and down which is pivotably connected to the first and second arms 2, 3 by the first and second pivotal members 71, 72. The first and second arms 2, 3 are pivoted toward each other to brake the wheel by the brake pads in the first and second slots 222, 321 of the first and second arms 2, 3. The first and second arms 2, 3 apply even forces to the two brake pads.

While the invention has been described in terms of preferred embodiments, those skilled in the art will recognize that the invention can be practiced with modifications within the spirit and scope of the appended claims.

What is claimed is:

1. A bicycle brake unit comprising:
a first arm having a first transverse portion and a first upright portion which is connected between a first end and a second end of the first transverse portion, the first transverse portion having a first cable connector on the first end thereof and a first rail connected to a lower side of the second end of the first transverse portion, the first upright portion having a first pivot hole defined therethrough, an axis of the first pivot hole being perpendicular to an axis of the first transverse portion;
a second arm located beside the first arm and having a second transverse portion and a second upright portion, the second transverse portion having a second cable connector on a first end thereof and a second end of the second transverse portion connected to the second upright portion, the first and second cable connectors being movable relative to each other by a cable, a flat face extending from the second arm and toward the first arm, the flat face having a second rail which is located corresponding to the first rail, a second pivot hole defined through the second end of the second arm;
a connector connected to the first arm, the first arm located between the second arm and the connector, the connector having a first inclined portion and a second inclined portion, the first and second inclined portions being connected as a V-shaped part, the first inclined portion having a third pivot hole which is located corresponding to the first pivot hole of the first arm, a first pivotal member extending through the first and third pivot holes, the second inclined portion having a fourth pivot hole which is located corresponding to the second pivot hole of the second arm, a second pivotal member extending through the second and fourth pivot holes, an elongate slot defined in a conjunction between the first and second inclined portions, and
a pivot rotatably connected between the first and second rails and being movable in the elongate slot.

2. The bicycle brake unit as claimed in claim 1, wherein the first upright portion has a first slot defined through a distal end thereof, an axis of the first slot is perpendicular to an axis of the first pivot hole, the second upright portion has a second slot defined through a distal end thereof, an axis of the second slot is the same as the axis of the first slot.

3. The bicycle brake unit as claimed in claim 2, wherein each of the first and second slots is connected with a brake pad.

4. The bicycle brake unit as claimed in claim 1, wherein the first and second rails are moved in opposite directions and the pivot is rotated.

5. The bicycle brake unit as claimed in claim 1, wherein a curved slot is defined between the first and second ends of the second transverse portion.

6. The bicycle brake unit as claimed in claim 1, wherein the pivot has a first flange, a shank, a second flange and a third flange, the first and second flanges are connected to two ends of the shank, the third flange is connected to outside of the second flange, an outer diameter of the second flange is smaller than that of the third flange, the shank is rotatably connected between the first and second rails, the first flange is rotatably clamped between the first and second rails, the second and third flanges are located in the elongate slot.

7. The bicycle brake unit as claimed in claim 1, wherein the cable is a steel cable.

* * * * *